United States Patent [19]

Noailly et al.

[11] Patent Number: 4,775,509
[45] Date of Patent: Oct. 4, 1988

[54] SPACER GRID FOR A NUCLEAR FUEL ASSEMBLY

[75] Inventors: Jean Noailly, Lyons; Jean-Pierre Denizou, Craponne, both of France

[73] Assignees: Framatome, Courbevoie; Compagnie Generale des Matières Nucleaires, Villacoublay, both of France

[21] Appl. No.: 18,319

[22] Filed: Feb. 24, 1987

[30] Foreign Application Priority Data

Feb. 24, 1986 [FR] France .................. 86 02501

[51] Int. Cl.⁴ .............................. G21C 3/34
[52] U.S. Cl. ............................ 376/442; 376/439
[58] Field of Search ...................... 376/442, 431

[56] References Cited

U.S. PATENT DOCUMENTS

| | | | |
|---|---|---|---|
| 3,068,163 | 12/1962 | Currier | 376/442 |
| 3,399,719 | 9/1968 | Forrest | 376/442 |
| 3,463,703 | 8/1969 | Crandall | 376/442 |
| 3,764,471 | 10/1973 | Ripley | 376/442 |
| 4,021,300 | 5/1977 | Marshall | 376/442 |
| 4,210,202 | 7/1980 | Boger | 376/442 |
| 4,297,170 | 10/1981 | Leclercq | 376/442 |
| 4,312,706 | 1/1982 | Snyder | 376/442 |
| 4,389,369 | 6/1983 | Bryan | 376/442 |
| 4,411,862 | 10/1983 | Leclercq | 376/442 |

Primary Examiner—Donald P. Walsh
Attorney, Agent, or Firm—Pollock, Vande Sande & Priddy

[57] ABSTRACT

A grid for use in a PWR assembly includes a peripheral girdle and at least two sets of parallel plates. The plates of one set are at an angle with respect to those of the other set so that the sets defined cells for the fuel rods. The parallel plates are distributed in at least two beds spaced apart in the longitudinal direction of the assembly. In a fuel assembly having a triangular array of fuel rods, three successive beds of mutually parallel plates are provided.

13 Claims, 10 Drawing Sheets

FIG.1.
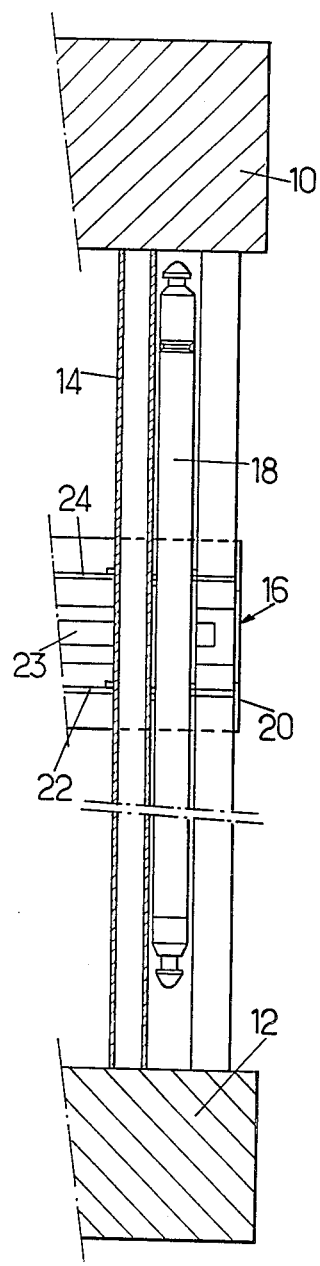
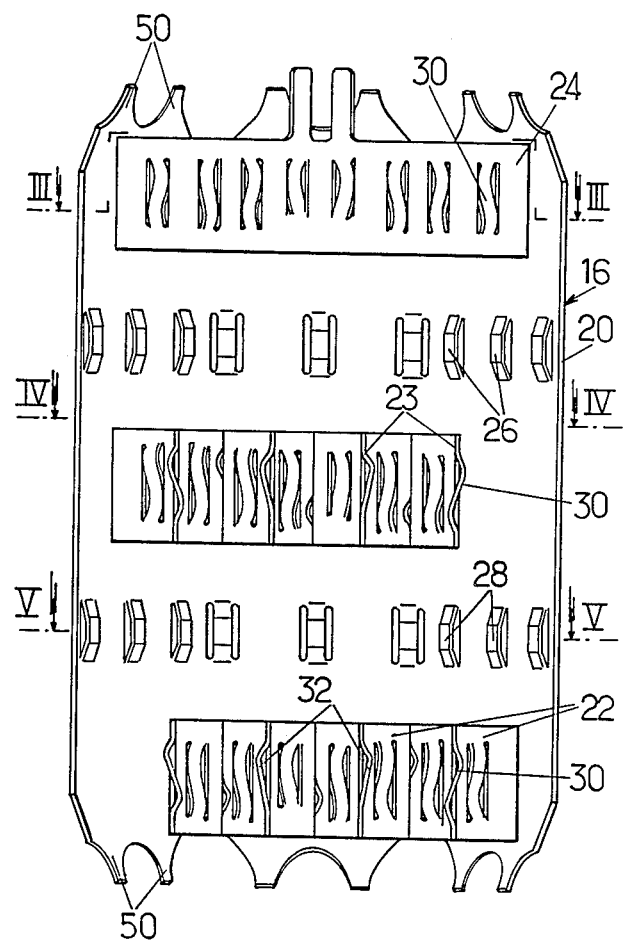
FIG.2.

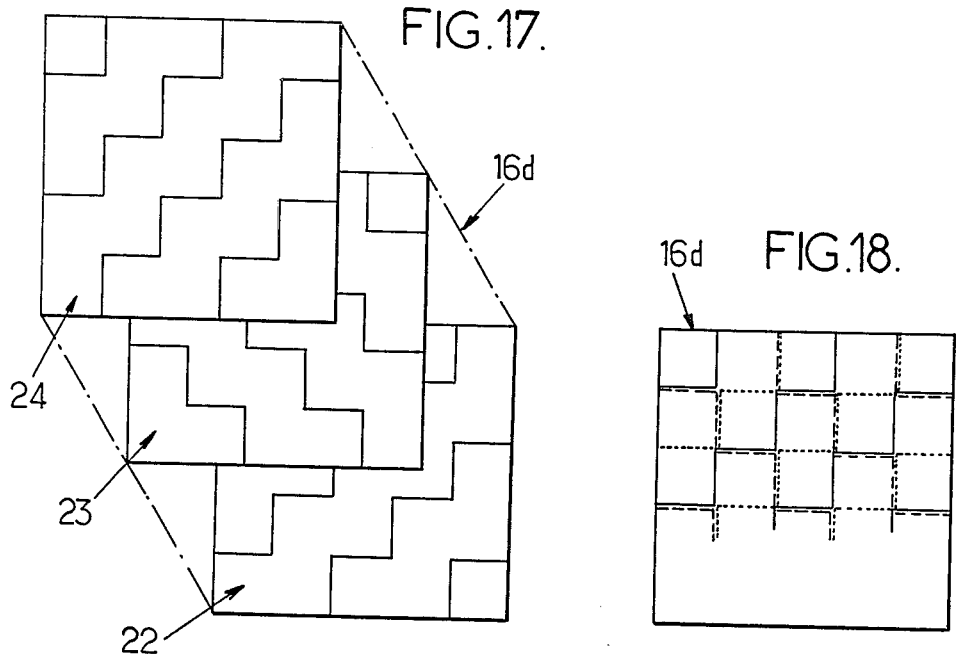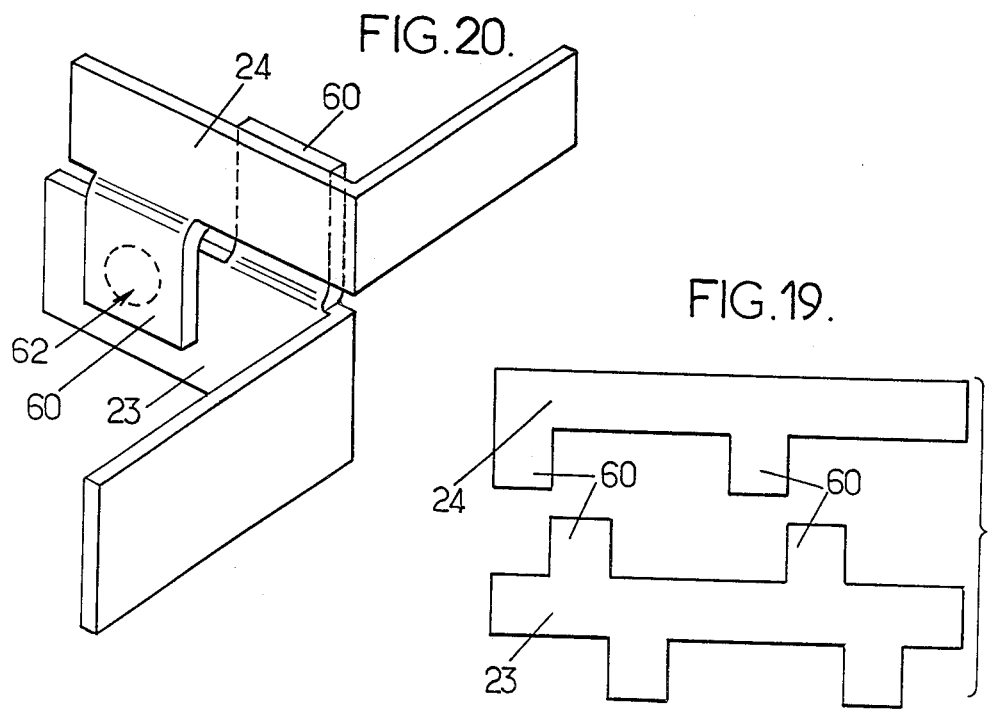

4,775,509

SPACER GRID FOR A NUCLEAR FUEL ASSEMBLY

BACKGROUND OF THE INVENTION

Technical Field

The invention relates generally to fuel assemblies for nuclear reactors of the type incorporating a bundle of fuel rods disposed at the nodal points of a regular array and spacer grids distributed along the bundle. The invention relates more particularly to grids for use in fuel assemblies, which include at least two series of mutually parallel plates or straps defining cells which receive fuel rods and possibly elements substituted for them at certain locations in the array.

Although the invention is general in scope, it is particularly suitable for use in fuel assemblies whose rods are arranged in a triangular array whose pitch is "tight", i.e., only a little greater than the diameter of the rods. The use of such a triangular lattice is desirable in an undermoderated reactor core, which means that the coolant streams between the rods must be narrow. However, the construction should allow the required coolant flow and provide adequate mixing of the coolant streams, without causing an excessive head loss.

The grids of nuclear fuel assemblies for water moderated and cooled reactors, and particularly PWRs, generally retain the rods at the nodal points of a square array. The grids typically include a girdle and two sets of orthogonal plates. A fuel assembly has also been proposed U.S. Pat. No. 3,068,163 having grids for maintaining the rods at the nodal points of a square array, which grids are formed by a flat or undulating endless strip passing between the rods, with intermeshing at the crossing points. This solution, if applied to a "tight" pitch fuel assembly, does not allow satisfactory coolant flow, conditions, mixing of the different streams and an acceptable pressure loss. Support grids for retaining a triangular array of fuel rods have also been proposed, for instance in European No. 0 065 613 (Downs), however including a single layer of intersecting corrugated strips arranged along two different directions.

SUMMARY OF THE INVENTION

It is an object of the invention to provide a grid for a nuclear fuel assembly which retains the rods efficiently and accurately and achieves mixing of the fluid streams, while including a small amount of neutron-absorbing material.

To this end, there is provided a spacing grid for a nuclear fuel assembly including a peripheral girdle and at least two sets of mutually parallel plates, the plates of one set being oblique with respect to the plates of the other set so that the sets define cells for the rods passing therethrough, wherein the parallel plates are distributed in at least two beds spaced apart in the longitudinal direction of the assembly.

In a fuel assembly having a triangular array of fuel rods, the plates of each set will be generally parallel to a respective one of the imaginary lines joining the centers of aligned rods, so that three sets of plates will be required.

In a first embodiment, the grid supports the rods: the plates are then provided with rod support means, such as bosses, dimples or tongues, for supporting each rod in each bed at at least two diametrically opposed points, the support points of a rod in a grid being distributed between several beds in which the plates belong to different sets. In other words, the support points of the same rod on the plates of one bed are offset angularly with respect to the supports by the plates of another bed.

In another embodiment, the grid is mainly intended to fulfill essentially a function of mixing the fluid streams. Then the two beds of the grids, (or two beds at least if the grid includes more of them) are provided with half-fins having different angular positions in the two beds.

In such a grid, whose function is essentially thermo-hydraulic, the plates may be thin and have a small height, as compared with the height of the usual grids which support the rods, center them and have a mixing function.

With the arrangement of the plates in several successive beds, the pressure loss is reduced as compared to that caused by a grid where all plates are in the same plane, for the same cumulative cross-section of all grids. Because the plates of several beds include mixing fins, the latter acquire a three-dimensional effect. Depending on the type of array and the arrangement of the fins, different types of mixing and flow distribution may be provided by selecting the most appropriate arrangement in each case.

In a grid having a mixing function, the girdle may be formed of several successive sections each associated with a bed, which sections are joined together solely by longitudinal junction elements, such as rods placed in the angles of the girdle.

In yet another embodiment, the grid simultaneously fulfills all different functions mentioned above.

The plates may be formed of metal strips which are flat or, for increased strength, corrugated to the spacing pitch of the rods along the plates. The metal strip, whether flat or undulated, may include bosses directed from one side and/or from the other side of the plate, towards the centers of the cells defined by the plate.

The invention also provides a fuel assembly of the above defined type in which some of the grids at least, intended to support and center the rods, are secured to tubes connected to end nozzles for forming an assembly skeleton. Some at least of the grids then have one of the above defined constructions providing support and are connected to the tubes of the skeleton by sleeves each of which is common to all beds in the grid.

BRIEF DESCRIPTION OF THE DRAWINGS

The invention will be better understood from the following description of particular embodiments given by way of example.

FIG. 1 is a partial and schematic view, in elevation, of an assembly which may be provided with grids in accordance with the invention;

FIG. 2 is a view of a grid in section through line II of FIG. 5, the rods being omitted;

FIG. 18 is a diagram showing the superimposition of the three beds of fins of FIG. 17, as seen from above;

FIG. 19 shows two plates which may be used in a grid of the kind shown in FIG. 17 and equipped with connecting fingers;

FIG. 20 is a detailed view in perspective showing one possible method of interweaving the fingers in a grid;

DETAILED DESCRIPTION OF PREFERRED EMBODIMENTS

Figure 3:
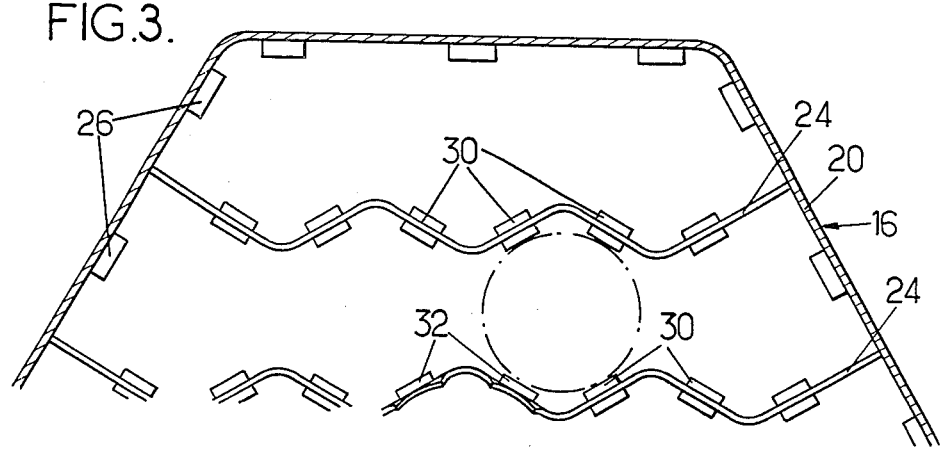
FIGS. 3, 4 and 5 are partial sectional views respectively through lines III—III, IV,VI and V—V of FIG. 2.

FIG. 1 shows schematically the only components concerned by the invention of a nuclear fuel assembly which may include, in a usual way, an upper end piece 10 and a lower end piece 12 connected together by guide tubes 14. On the guide tubes 14 are mounted several grids 16 spaced apart along the assembly. Some at least of the grids are fixed to the guide tubes 14 and hold the fuel rods 18 in position in a regular array.

The assembly described by way of example has a hexagonal cross-section and the grids 16 hold the rods in position at the nodal points of an array or "Lattice" whose elementary cell is an equilateral triangle whose sides are parallel to the plates which form the girdle 20 of grid 16. Guide tubes 14 are substituted for the rods 18 at some nodes of the array.

Some at least of the grids 16 are as shown in FIGS. 2 to 5. They each include a plurality of beds of mutually parallel plates for holding and spacing the rods, fixed to the girdle 20 and spaced in the longitudinal direction. In the embodiment shown in FIGS. 2 to 5, the grid 16 has three beds of plates, each bed being perpendicular to the longitudinal axis of the assembly. Each bed is formed of a series of mutually parallel plates. The plates of the set forming the top bed 24 are at 60° from the plates 22 and 23 and all the plates are fixed to the girdle in a conventional way, generally by welding.

In the construction shown in FIGS. 2 to 5, the girdle is formed of a flat bent metal strip and the plates of the three beds are undulated or corrugated at the spacing pitch of the rods. In order to provide resilient holding of the latter, support means are provided on the girdle and on the plates. The support means include two rows of support bosses 26 and 28 provided on the girdle 20, halfway between the beds of plates (FIG. 2). The bosses are formed by portions cut out in the metal strip which forms the girdle 20 and bent so as to projet inwardly of the girdle.

The support means further include, on each of plates 22, 23 and 24, resilient tongues for engagement with the rods. Some of these tongues, designated 30, have an S-shape so as to cooperate with adjacent rods of the lattice. Others, designated at 32, only project from a single side. They will more particularly be provided at a position where the plates define a pocket for receiving not a fuel rod 18 but a tube 14.

With such an arrangement, each rod is supported at four points at the level of each bed. The four support points are offset angularly by 120° when passing from one bed to the next. The girdle and the plates may be formed, in a conventional way, from an alloy called "INCONEL", from stainless steel or from a zirconium based alloy.

Figure 4:
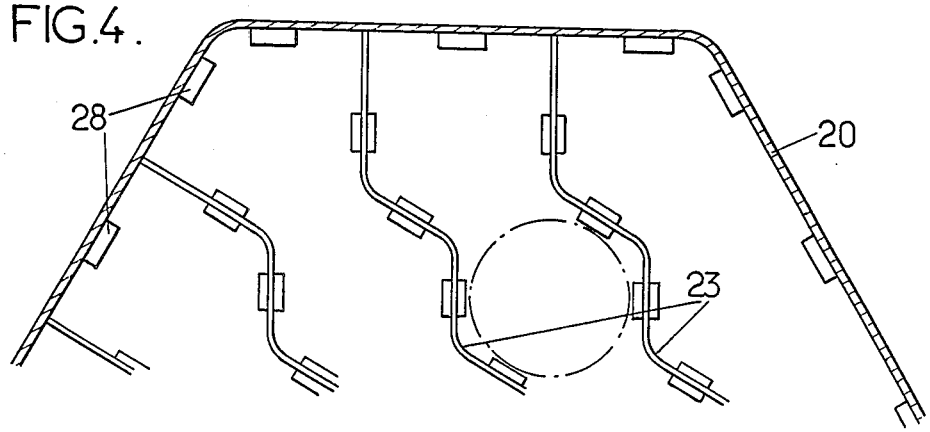
Figure 5:
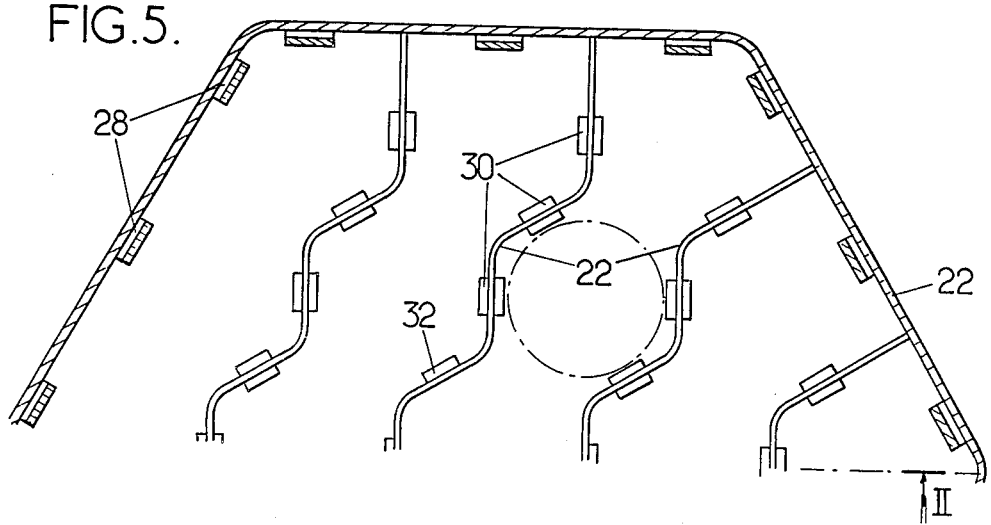
Figure 6:
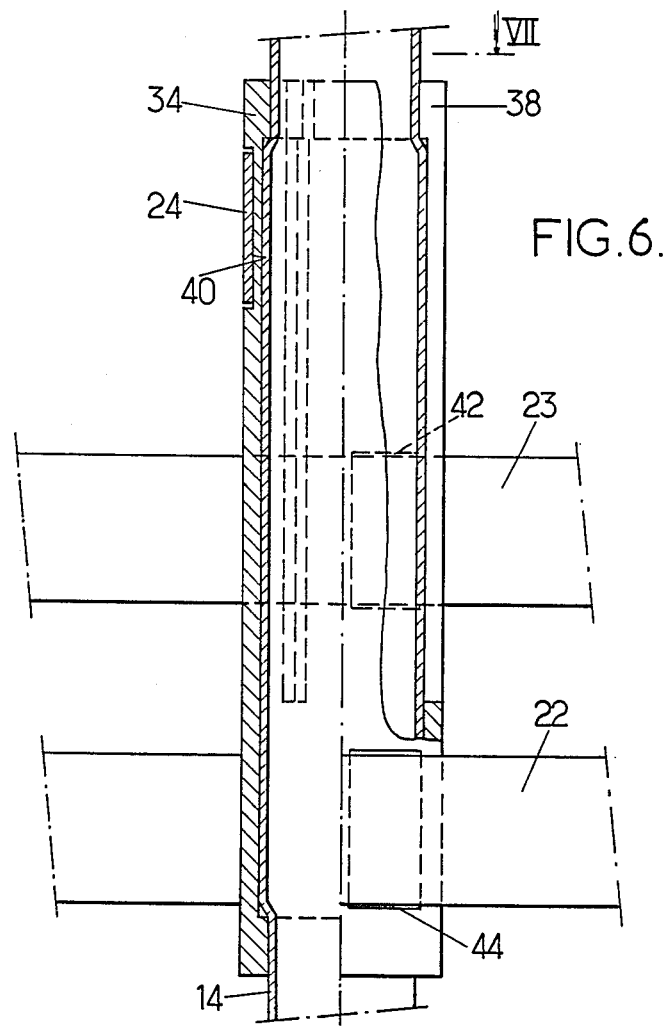
FIG. 6 is a sectional view through a vertical plane showing how a grid is connected to a guide tube using a sleeve or sheath.
Figure 7:
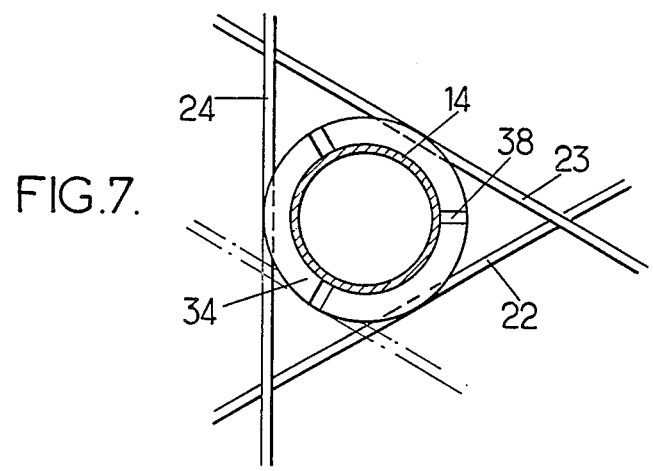
FIG. 7 is a top view of the sleeve of FIG. 6.
Figure 8:
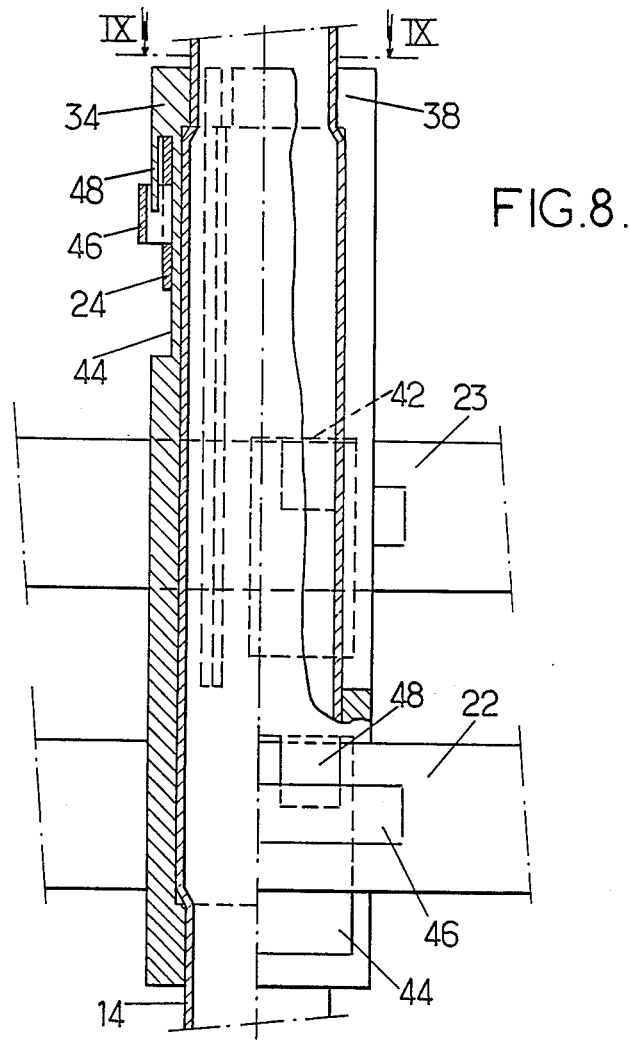
FIGS. 8 and 9, similar to FIGS. 6 and 7, show a modified construction of the sleeve.
Figure 9:
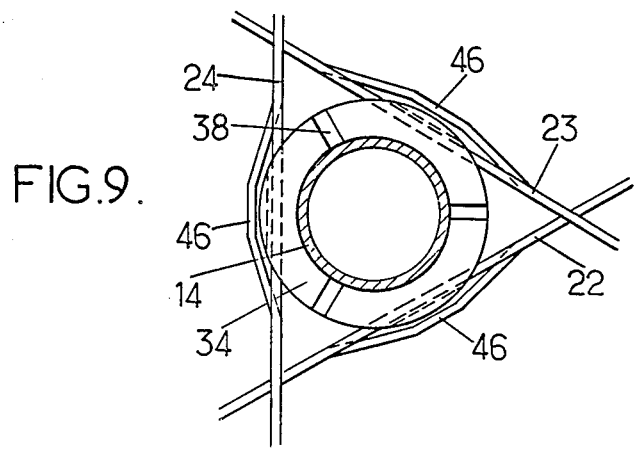

Each guide tube 14, such as the one shown in dot dash lines in FIGS. 3, 4 and 5, is fixed to each of the three beds of the grid 16. Fixing is advantageously provided by means of a split sleeve or sheath 34, as shown in FIGS. 6 and 7. Each sleeve 34 is fixed to a guide tube 14, at a suitable position, by imprisoning the guide tube in the sleeve, as is clear from FIG. 6. The presence of the longitudinal slit 38 in the sleeve provides the flexibility required for inserting the guide tubes and clamping them. Pairs of flats 40, 42 and 44 formed on the sleeve are provided for positioning and retaining the associated plates 24, 23 and 22. These plates may be welded to the sleeve 38 or simply positioned. On this latter assumption, in a variant of construction shown in FIGS. 8 and 9 (where the members already shown in FIGS. 6 and 7 bear the same reference numbers), the plates have punctured portions 36 for imprisoning the lugs 48 formed for this purpose in sleeve 34, these punctured portions then serving as rod supporting elements.

The grid shown in FIG. 2 further includes fins 50 formed on the edge of the girdle and facilitating the introduction of the assemblies in the core, simultaneously with mixing of the coolant.

In the grids shown in FIGS. 2 to 9, the beds of plates 22, 23 and 24 are disjointed and separated by a gap which is of the same order as the height of the plates. But it would also be possible to use jointing beds, the plates of one bed being engaged with those of the adjacent bed, or on the contrary the gap between the beds may be increased.

The plates may further be provided with mixing fins, so as to provide both a supporting function and a function of mixing the fluid streams. These fins may have one of the constructions which will now be described, in their application to grids having a mixing function.

These mixing grids may be alternated with support grids in the same fuel assembly.

The mixing grids must provide the best compromise possible between requirements which are to some extent contradictory. Their neutron absorption must be as low as possible, which leads to reducing as much as possible the mass of material which forms them and in choosing, as far as possible, a material with a small capture section such as a zirconium based alloy. The mixing fins must homogenize the flow and reduce the temperature differences by causing transverse redistribution of the coolant streams. But the presence of the fins must not cause an increase of the pressure loss such that there is an unacceptable reduction of the flow rate.

The distribution of the plates in several beds offset in the axial direction decreases the pressure loss. When the plates are provided with fins, these latter may be distributed axially between the beds so as to obtain a three-dimensional effect. Several exemplary types will now be described with advantageous distributions, leading to different flow modes, some of which are particularly well adapted to a triangular mesh and others to a square mesh.

Figure 10:
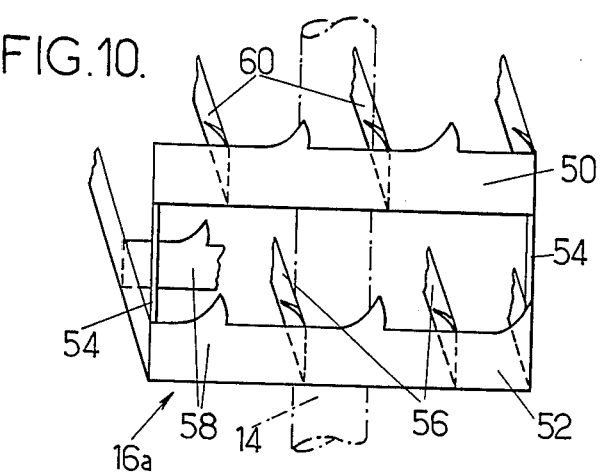
FIG. 10 is an isometric diagrammatic view showing a possible arrangement of the fins in a mixing grid with two beds of plates.

By way of a first example of a mixing grid, FIG. 10 shows a lattice of 5×5 rod reception pockets 18. Grid 16a, a fraction of which is shown, includes two spaced beds 50 and 52. The beds are connected together by corner rods or bars. Each bed includes plates oriented in two different directions, but each bed is incomplete in that a pocket is only completely defined by plates belonging to the two beds. It can be seen, for instance, that bed 52 includes plates 56 oriented in a first direction and plates 58 oriented in the perpendicular direction. The set of plates having the first direction is completed by plates 60, disposed in staggered fashion with respect to the first ones, but belonging to bed 50. Plates 56, 58, 60 include means for mixing the fluid streams. These means are formed of half-fins each placed on a single elementary pocket and disposed in opposite pairs at the corners of the pockets.

Figure 11:
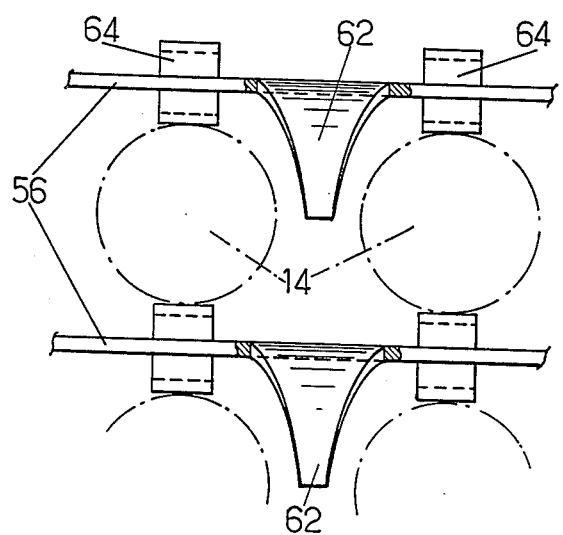
FIG. 11 is a detail view, from the top of a grid and in partial section, showing fins formed in the inside of the plates.

In the variant of construction shown in FIG. 11, plates 56 have complete fins 62 cut out in a non-emergent window of the plates. FIG. 11 also shows centering fingers 64 which may have a construction similar to that shown in FIG. 2.

Figure 12:
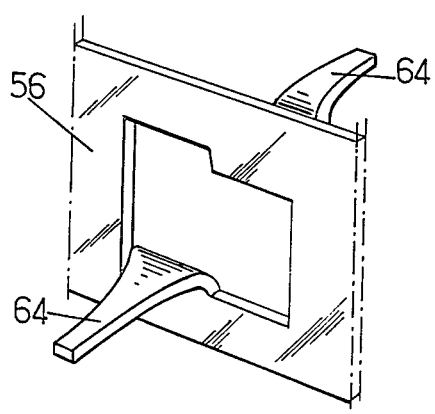
FIG. 12 is a detail view in perspective showing half-fins formed from cut-out portions of a plate.

In a further variant of construction, shown in FIG. 12, two opposite half-fins 64 are formed by stamping and deformation in each window of a plate 56.

Figure 13:
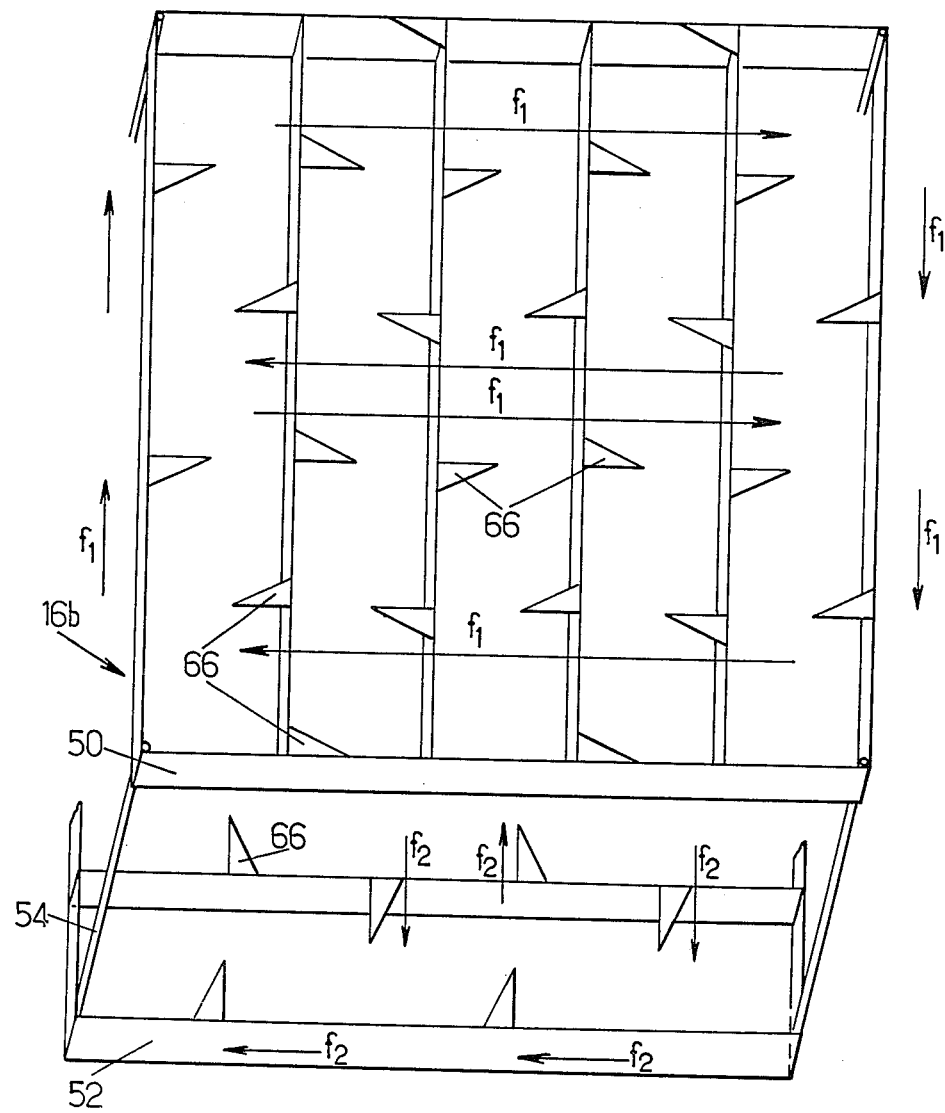
FIG. 13 is a schematic illustration, in perspective, of a mixing grid in a particular embodiment.

FIG. 13 shows an advantageous distribution of the half fins 66 in the case of a grid 16b having two beds 50 and 52, each bed being formed of a set of plates all having the same direction, the plates of one set being orthogonal to the plates of the other set. The half-fins 66 carried by the same plate are spaced apart at regular intervals, equal to the dimension of a pocket and directed alternately in one direction and in the other. The projection on the same plane of two sets of fins leads to a complete lattice of orthogonal fins. But, contrary to what would happen if all the plates were in the same plane, each lattice of fins causes its own cross flow mode. This flow mode is shown schematically by the arrows F1 in so far as bed 50 is concerned and F2 in so far as bed 52 is concerned. On its passage through the first bed, the air gaps of the same direction are swept in a given direction by the coolant. On passing through the second bed, it is the air gaps of perpendicular direction which are swept in their turn.

Figure 14:
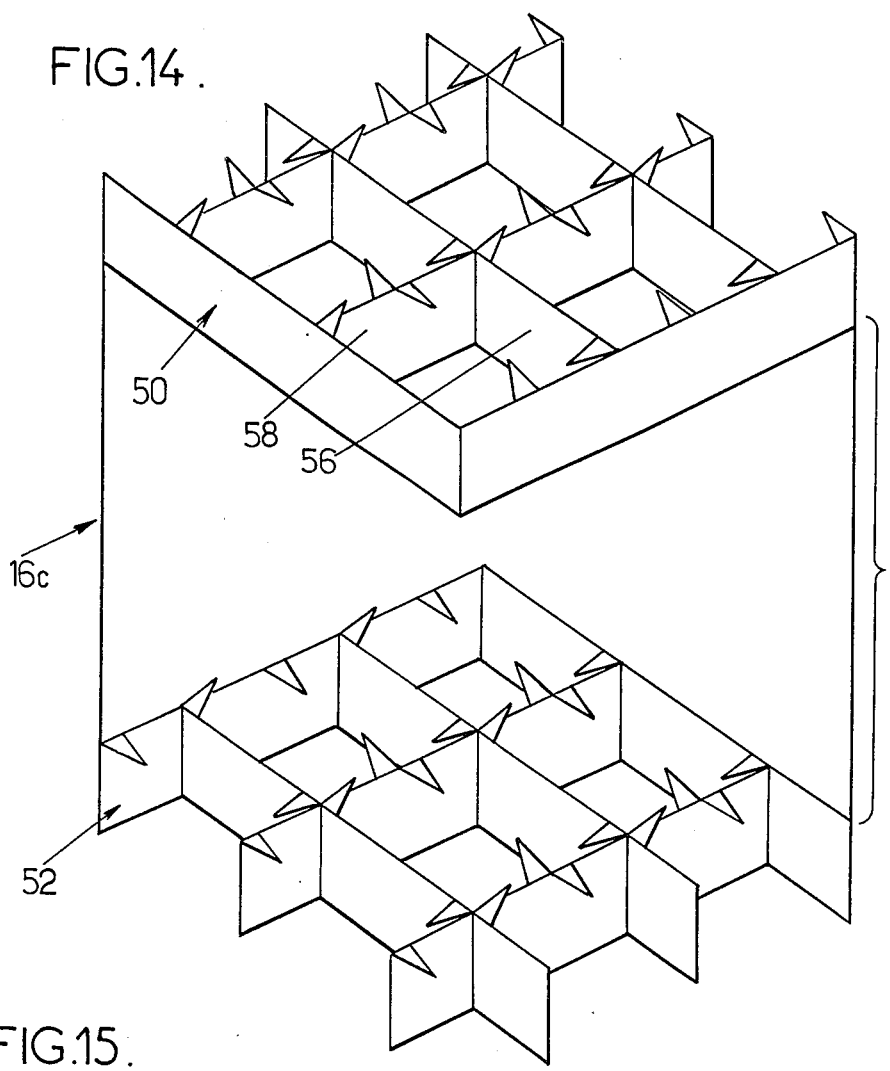
FIG. 14 is a perspective diagrammatic view showing a possible arrangement of the fins in a two-bed grid, each bed including plates in two orthogonal directions.

In the variant of construction shown in FIG. 14, each of the two beds 50 and 52 of grid 16c include half of the fins belonging to one set of fins parallel to a first direction and another half of fins of the set directed in the orthogonal direction. In other words, in a given set, each plate belongs alternately to the upper bed and to the lower bed.

In a given bed, the plates belonging to a set (plates 56 for example) include two half-fins at each intersection with the plates 58 of the other set, the two half-fins being in opposite directions. And plates 58 of the same bed include two half-fins in the middle of the space which extends between two crossing points.

In axial projection, the superimposition of the two fin lattices again leads to a complete lattice of opposite fins. But, if all the fins were in the same plane, they would generate a circumferential coolant current about each rod. On the contrary, in the grid shown in FIG. 14, the two half fins which, about a given rod, cause the flow of the coolant about the rod, are situated at different axial sides and promote the appearance of a helical current more favorable from the mixing point of view.

Figure 15:
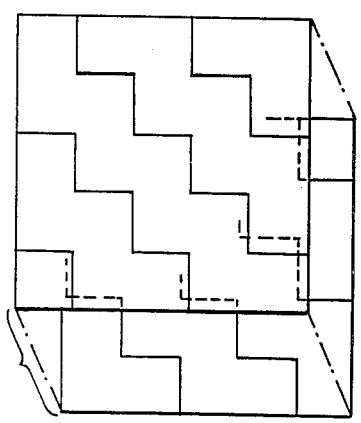
FIGS. 15 and 16 are diagrams showing how the plates may be located with respect to each other, respectively when they have a staircase shape and a crenellated shape, in a three-bed grid.
Figure 16:
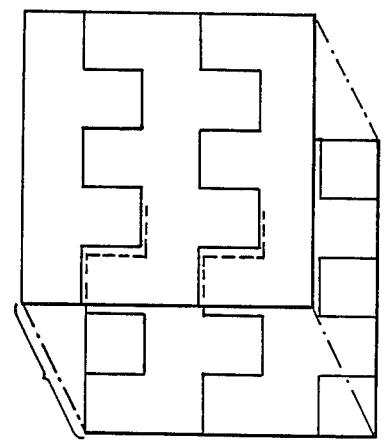

The plates may include, instead of the straight plates of FIGS. 13 and 14, plates bent in the form of a staircase or in crenellated form. FIGS. 15 and 16 show schematically two possible arrangements of the plate in a two bed grid, each plate having a staircase shape (FIG. 15) or a crenellated shape (FIG. 16). Other combinations are further possible, having two or three superimposed beds.

In yet another variant of construction, the beds are jointing and some of the plates of each bed have lugs criss-crossing with other beds. This solution has the advantage of providing good mechanical strength and facilitating the distribution of the fins, particularly in the case of a rectangular mesh lattice.

FIGS. 17 to 20 show possible construction of a three-bed grid, the plates of each bed 22, 23 and 24 being bent in the form of a staircase. It can be seen that the arrangement of the plates is such that, in projection, they completely define the pockets: FIG. 18 is such a top view of the three beds of a grid, showing the superimposition of the plates of the three beds, represented for the sake of clarity respectively in continuous lines, broken lines, dotted lines. Some pocket walls include grid sections placed one above the other. The beds may then be secured together in a simple way by providing the plates, in the sections in coincidence, with securing lugs 60 (FIG. 19). These lugs may be interfitted with each other as shown schematically in FIG. 20. Another solution consists in forming, in some of the lugs, buttons such as 62 which engage in recesses in the associated plates. The number of lugs may then be reduced. Another solution consists in providing fixing by rivets or spot welding. The rivets may also form means for centering the rods.

Figure 21:
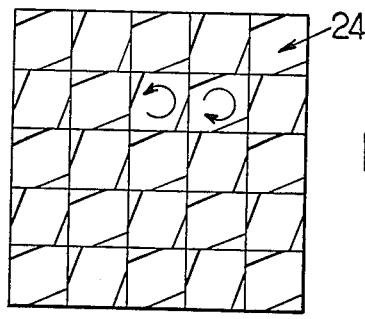
FIG. 21 shows, in a top view, a grid defining a square array of cells, each cell having two opposite fins.
Figure 22:
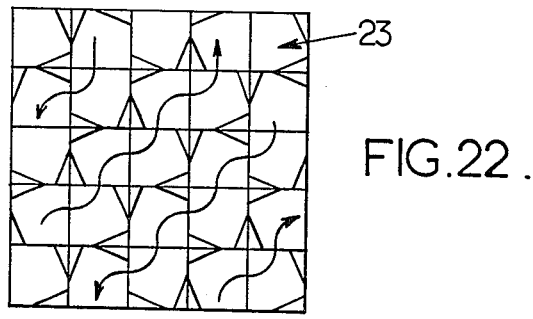
FIG. 22, similar to FIG. 21, shows a fin distribution which may be called braided lattice.

A grid thus formed has the advantage of good mechanical strength and simple manufacture, especially when it uses centering rivets. The arrangement of the plates in two perpendicular directions introduces heterogeneities promoting mixing. Finally, the fins may be disposed both in the upper layer and in the lower layer. When the grid has three beds of plates, it is possible to distribute the mixing fins in the three beds. In particular, a bed with three grids may be provided for reconstituting by superimposition a half-fin arrangement of the kind shown in FIG. 21 or the half-fin distribution shown in FIG. 22 which may be termed "braided lattice" and which creates diagonal and opposite flows in the air gaps between rods. For that, the following may be provided:

an upper bed of plates 24 having a braided lattice of half-fins organizing in a first direction;

a middle bed of fins 23 having fins in a similar braided arrangement, but on opposite direction;

a lower layer not having any fins, but only lugs for fixing it to the upper and middle beds so as to create a mechanicaly rigid grid.

Figure 22A:
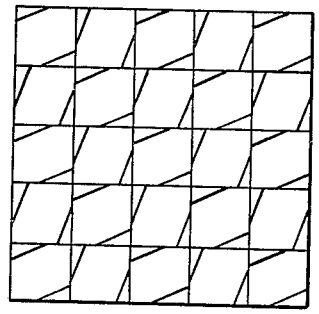
FIG. 22A, similar to FIG. 22, shows how a network of the type shown in FIG. 21 may be formed by superimposing two sets of half fins each belonging to a bed and having in each bed a distribution of the "braided lattice" type.

Each cell containing a rod is then provided with two half-fins, one belonging to the upper bed and the other to the middle bed, which tends to cause the coolant to rotate in spiral fashion about the rod in one direction which changes when going from one cell to the next cell. With this combination of two braided lattices, we find again the effects of the network shown in FIG. 21, but using fins placed in two planes offset in the general flow direction and whose relative distribution is shown in FIG. 22a.

The design which has just been described in the case of a square lattice is directly transposable to the case of a triangular lattice. The plates are then bent at 60° and not at 90° and the lower bed is complete so as to define a triangle of plates about each rod and not a diamond shape. With this arrangement, the support element carried by the plate may be perpendicular to each rod. The plates of the lower bed may be provided with lugs for fixing to the upper and middle beds.

Figure 23:
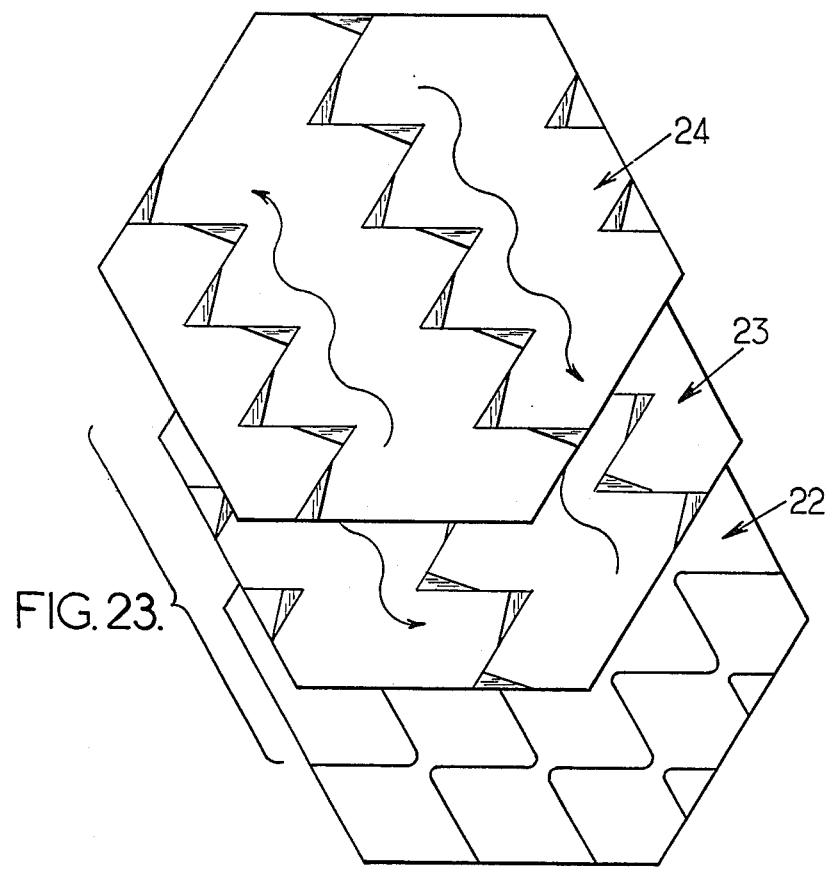
FIG. 23 is a diagram showing a possible arrangement of the plates in a three bed grid defining a triangular array.
Figure 24:
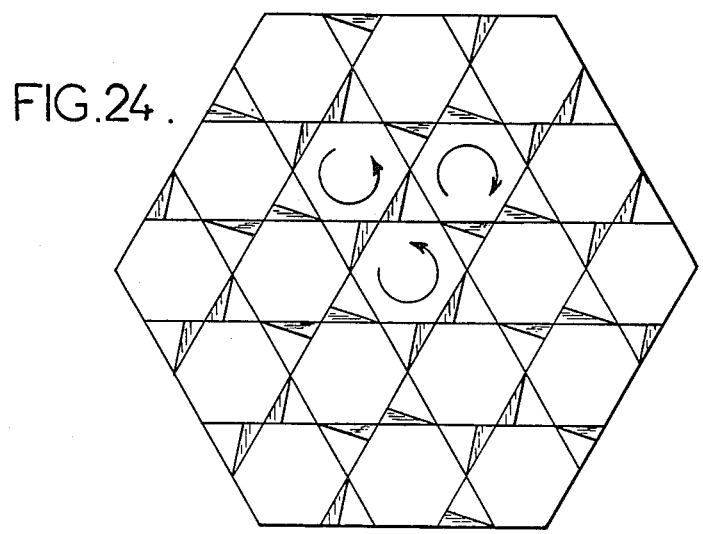
FIG. 24 is a schematical top view showing the distribution of the half fins in a complete grid including the three beds shown in FIG. 23.

FIGS. 23 and 24 show respectively a possible construction of the three beds and the fin arrangement obtained by the superimposition of these three beds.

It will be generally seen that the invention provides great flexibility of construction and permits the most advantageous solution in each case. The plates may be straight or bent in the form of a staircase or in crenellated form; the beds may be non-jointing; the fins may be provided on one or more beds so as to provide a mixing function. The fins may be stamped in the plates themselves and be placed at the level of the air gaps between rods because of the absence of crossing of plates at the same level. The plates may have a perforated or crenellated shape. Finally, it is possible to brace the beds so as to ensure good mechanical strength, possibly using means which also participate in centering the rods.

We claim:

1. In a nuclear fuel assembly having an array of fuel rods, a spacing grid including a common peripheral girdle and at least two sets of mutually parallel plates secured to said girdle, the plates of one set being oblique with respect to those of the other set so that these sets define pockets for guiding the fuel rods, wherein said plates are distributed in at least two beds spaced apart in the longitudinal direction of the assembly with the plates in one bed being out of contact with the remaining plates.

2. A fuel assembly according to claim 1, having a triangular array of said fuel rods, wherein the plates of each one set are parallel to a different one of the sides of the triangular array and three sets of plates are provided in said grid.

3. A fuel assembly according to claim 2, wherein said array is triangular and each of said fuel rods is supported circumferentially along at least three generatrices, by engagement with means provided on each plate, at three different longitudinal levels.

4. A fuel assembly according to claim 3, wherein each fuel rod is supported circumferentially at at least two points of each bed formed of plates of parallel directions.

5. A fuel assembly according to claim 3, wherein each fuel rod is supported at a plurality of points distributed circumferentially and defined by resilient engagement of the plates of each bed, at three different longitudinal levels.

6. A fuel assembly according to claim 1, wherein two beds at least of the grid are provided with half fins having different orientations in the two beds, the half fins of the plates in one bed being in a direction transverse to that of the half fins of the other bed.

7. A fuel assembly according to claim 6, wherein the plates are of metal strip formed with bosses directed from one side at least of the plate, towards the center of the fuel rod receiving cells defined by the plate.

8. A fuel assembly according to claim 2, wherein two successive ones of said beds are adjacent in said some at least of said grids and the plates of the two successive beds have intermeshing lugs.

9. A fuel assembly according to claim 6, wherein the half fins are situated on at least one of the edges of the plate or are formed in the plate by stamping.

10. A fuel assembly according to claim 1, further including two end pieces rigidly connected by guide tubes, wherein each of said guide tubes is connected to some at least of the grids by sleeves each permanently securely connected to the guide tube and each retaining the plates which define the grid cell through which said sleeve projects.

11. A nuclear fuel assembly having an array of fuel rods and a plurality of separate grids for supporting and spacing fuel rods which are distributed and spaced apart along said array, each of which includes a peripheral girdle surrounding said array and a plurality of sets of mutually parallel plates secured to said girdle, the plates of one set being at an angle with respect to the plates of the other sets, wherein, in each one of some at least of said grids,
   said plates are distributed into at least two beds spaced apart in the longitudinal direction of said rods,
   said girdle and plates provided with boss means and resilient tongues arranged for abutting contact with said rods and so distributed that each of said rods is supported in each bed by said boss means and resilient tongues at at least a couple of two diametrically opposed contact points, the contact points in the grid being distributed between all beds and the plates of different beds belonging to different ones of said sets.

12. A nuclear fuel assembly having an array of fuel rods and a plurality of separate grids for supporting and spacing said fuel rods, said grids being spaced apart along said array and each of said grids including a separate peripheral girdle surrounding said array and a plurality of sets of mutually parallel plates secured to said girdle, the plates of one set being at an angle with respect to the plates of the other sets, wherein, in each one of some at least of said grids,
   said plates are distributed into at least two beds spaced apart in the longitudinal direction of said rods,
   the girdle is formed of a plurality of longitudinally spaced sections each surrounding said array and each carrying one of said beds, said sections being connected together solely by longitudinal elongated junction elements placed in angles of the girdle.

13. A fuel assembly according to claim 1 having a triangular array of said fuel rods, wherein the plates of each of said sets are parallel to a different one of the sides of the triangular array,
   three beds of plates are provided each consisting of one of three sets of plates,
   all said plates are provided with resilient tongues directed along three directions at a mutual angle of 60° and arranged for abutting the fuel rods, and
   said girdle consists of a continuous metal strip formed with fuel rod supporting bosses longitudinally located between successive ones of said beds.

* * * * *